(12) United States Patent
Huang et al.

(10) Patent No.: US 12,260,161 B2
(45) Date of Patent: Mar. 25, 2025

(54) METHOD FOR ESTABLISHING VARIATION MODEL RELATED TO CIRCUIT CHARACTERISTICS FOR PERFORMING CIRCUIT SIMULATION, AND ASSOCIATED CIRCUIT SIMULATION SYSTEM

(71) Applicant: Realtek Semiconductor Corp., HsinChu (TW)

(72) Inventors: Wei-Ming Huang, HsinChu (TW); Szu-Ying Huang, HsinChu (TW); Mei-Li Yu, HsinChu (TW); Yu-Lan Lo, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 583 days.

(21) Appl. No.: 17/693,396

(22) Filed: Mar. 13, 2022

(65) Prior Publication Data
US 2023/0142132 A1  May 11, 2023

(30) Foreign Application Priority Data
Nov. 10, 2021   (TW) .................................. 110141776

(51) Int. Cl.
*G06F 30/3308*     (2020.01)
*G06F 30/3323*     (2020.01)
(Continued)

(52) U.S. Cl.
CPC ............ *G06F 30/3308* (2020.01); *G06N 7/08* (2013.01); *G06F 30/3323* (2020.01);
(Continued)

(58) Field of Classification Search
CPC ............ G06F 30/3308; G06F 30/3323; G06F 30/367; G06F 30/398; G06F 2119/02; G06N 7/08
(Continued)

(56) References Cited

U.S. PATENT DOCUMENTS 8,601,416 B2 * 12/2013 Kuo ...................... G06F 30/367
716/136
9,606,965 B2 * 3/2017 Yoshimura .............. G06F 7/588
(Continued)

FOREIGN PATENT DOCUMENTS

EP       2006784 A1 * 12/2008  ......... G06F 17/5031
JP    2008112406 A  *  5/2008
(Continued)

OTHER PUBLICATIONS

Cadence, "The Use of the Monte Carlo Method in Sensitivity Analysis and Its Advantages", https://resources.pcb.cadence.com/blog/2020-the-use-of-the-monte-carlo-method-in-sensitivity-analysis-and-its-advantages, Nov. 20, 2020, 9 pages. (Year: 2020).*
(Continued)

*Primary Examiner* — Phallaka Kik
(74) *Attorney, Agent, or Firm* — Winston Hsu

(57) ABSTRACT

A method for establishing a variation model related to circuit characteristics for performing circuit simulation includes: performing first, second, third, and fourth Monte Carlo simulation operations according to a first netlist file and predetermined process model data to generate a first, a second, a third, and a fourth performance simulation results, respectively, where the first netlist file is arranged to indicate a basic circuit in a circuit system; and execute a performance simulation results expansion procedure according to the first, the second, the third, and the fourth performance simulation results to generate a plurality of performance simulation results to establish the variation model, for performing the circuit simulation to generate at least one circuit simulation result according to one or more performance simulation results among the plurality of performance simulation results, where the number of the plurality of performance simulation results is greater than four.

10 Claims, 9 Drawing Sheets

(51) Int. Cl.
*G06F 30/367* (2020.01)
*G06F 30/398* (2020.01)
*G06N 7/08* (2006.01)
*G06F 119/02* (2020.01)

(52) U.S. Cl.
CPC .......... *G06F 30/367* (2020.01); *G06F 30/398* (2020.01); *G06F 2119/02* (2020.01)

(58) Field of Classification Search
USPC ................ 716/106, 111, 136; 703/16, 2
See application file for complete search history.

(56) References Cited

U.S. PATENT DOCUMENTS

| | | | |
|---|---|---|---|
| 9,904,743 B2* | 2/2018 | Liu | G01R 31/28 |
| 10,204,188 B2* | 2/2019 | Wang | G06F 30/398 |
| 10,528,644 B1* | 1/2020 | Zhang | G06F 17/18 |
| 10,776,548 B1* | 9/2020 | Liu | G06F 30/367 |
| 2002/0143507 A1* | 10/2002 | Lu | G06F 30/13 |
| | | | 703/7 |
| 2009/0031268 A1 | 1/2009 | Miranda | |
| 2013/0246986 A1* | 9/2013 | Kuo | G06F 30/367 |
| | | | 716/106 |
| 2016/0267205 A1* | 9/2016 | Wang | G06F 30/367 |
| 2017/0235862 A1* | 8/2017 | Fukuda | G06F 17/16 |
| | | | 703/2 |
| 2022/0262524 A1* | 8/2022 | Suchoski | G16H 15/00 |

FOREIGN PATENT DOCUMENTS

| | | | | |
|---|---|---|---|---|
| JP | 2008134826 A | * | 6/2008 | .......... G06F 30/367 |
| JP | 2009146072 A | * | 7/2009 | |
| JP | 5007664 B2 | * | 8/2012 | |
| JP | 2014119794 A | * | 6/2014 | |
| TW | 202018544 A | | 5/2020 | |
| TW | 1697797 B | * | 7/2020 | .......... G06F 30/3315 |

OTHER PUBLICATIONS

Chen et al., Taiwan Patent Document No. TW-774381-B1, published Aug. 11, 2022, 2 pages including abstract. (Year: 2022).*

* cited by examiner

METHOD FOR ESTABLISHING VARIATION MODEL RELATED TO CIRCUIT CHARACTERISTICS FOR PERFORMING CIRCUIT SIMULATION, AND ASSOCIATED CIRCUIT SIMULATION SYSTEM

BACKGROUND OF THE INVENTION

1. Field of the Invention

The present invention relates to circuit design, and more particularly, to a method for establishing a variation model related to circuit characteristics for performing circuit simulation and an associated circuit simulation system.

2. Description of the Prior Art

The conventional integrated circuit (IC) design flow typically takes a long time to complete the entire IC design without any errors for mass production. More particularly, basic circuits such as standard cells in an IC may delay signals with different values in different situations, and the database used in the conventional IC design flow may only record the delay value information of each standard cell under specific application conditions, so the delay value information is limited. The delay value information that is limited as described above is not enough to be used for calculating the parameter variation results that are needed during the IC design. As a result, the IC designer may have to wait until the IC is fabricated before testing the IC, to determine whether the delay values of the standard cells in the IC meet the requirements within a predetermined voltage range, respectively. If any standard cell in the IC does not meet the requirements, the IC must be redesigned, that is, the entire design process must be re-performed, which is a heavy burden for the relevant personnel. Some suggestions have been proposed in the related art to try solving this problem, but may create additional problems such as certain side effects. Thus, a novel method and associated architecture are needed for reducing the time of completing the entire IC design without any errors for mass production with no or fewer side effects.

SUMMARY OF THE INVENTION

It is therefore an objective of the present invention to provide a method for establishing a variation model related to circuit characteristics for performing circuit simulation and an associated circuit simulation system, in order to solve the above-mentioned problems.

It is another objective of the present invention to provide a method for establishing a variation model related to circuit characteristics for performing circuit simulation and an associated circuit simulation system, to reduce the time of completing the entire IC design without any errors for mass production with no or fewer side effects.

At least one embodiment of the present invention provides a method for establishing a variation model related to circuit characteristics for performing circuit simulation. The method may comprise: performing a plurality of first Monte Carlo simulation operations in parallel according to a first netlist file and predetermined process model data to generate a first performance simulation result, wherein the first netlist file is arranged to indicate a basic circuit in a circuit system; performing a plurality of second Monte Carlo simulation operations in parallel according to the first netlist file and the predetermined process model data to generate a second performance simulation result; performing a plurality of third Monte Carlo simulation operations in parallel according to the first netlist file and the predetermined process model data to generate a third performance simulation result; performing a plurality of fourth Monte Carlo simulation operations in parallel according to the first netlist file and the predetermined process model data to generate a fourth performance simulation result; and executing a performance simulation results expansion procedure according to the first performance simulation result, the second performance simulation result, the third performance simulation result and the fourth performance simulation result to generate a plurality of performance simulation results to establish the variation model, for performing the circuit simulation to generate at least one circuit simulation result of the circuit system according to one or more performance simulation results among the plurality of performance simulation results, wherein the number of the plurality of performance simulation results in the variation model is greater than four.

At least one embodiment of the present invention provides a circuit simulation system. The circuit simulation system comprises at least one memory circuit and at least one processor circuit. The at least one memory circuit is configured to store a plurality of program codes. The at least one processor circuit is configured to execute the plurality of program codes in the at least one memory circuit to establish a variation model related to circuit characteristics for performing circuit simulation. The at least one processor circuit performs a plurality of first Monte Carlo simulation operations in parallel according to a first netlist file and predetermined process model data to generate a first performance simulation result, wherein the first netlist file is arranged to indicate a basic circuit in a circuit system. The at least one processor circuit performs a plurality of second Monte Carlo simulation operations in parallel according to the first netlist file and the predetermined process model data to generate a second performance simulation result. The at least one processor circuit performs a plurality of third Monte Carlo simulation operations in parallel according to the first netlist file and the predetermined process model data to generate a third performance simulation result. The at least one processor circuit performs a plurality of fourth Monte Carlo simulation operations in parallel according to the first netlist file and the predetermined process model data to generate a fourth performance simulation result. The at least one processor circuit executes a performance simulation results expansion procedure according to the first performance simulation result, the second performance simulation result, the third performance simulation result and the fourth performance simulation result to generate a plurality of performance simulation results to establish the variation model, for performing the circuit simulation to generate at least one circuit simulation result of the circuit system according to one or more performance simulation results among the plurality of performance simulation results. The number of the plurality of performance simulation results in the variation model is greater than four.

One of the advantages of the present invention is that, through a variation model establishment mechanism that is carefully designed, the method and circuit simulation system of the present invention can simultaneously enhance circuit simulation speed and maintain circuit simulation accuracy without being hindered by the trade-off between circuit simulation speed and circuit simulation accuracy. In comparison with the related art, the method and circuit simulation system of the present invention can reduce the time of completing the entire IC design without any errors for mass production with no or fewer side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
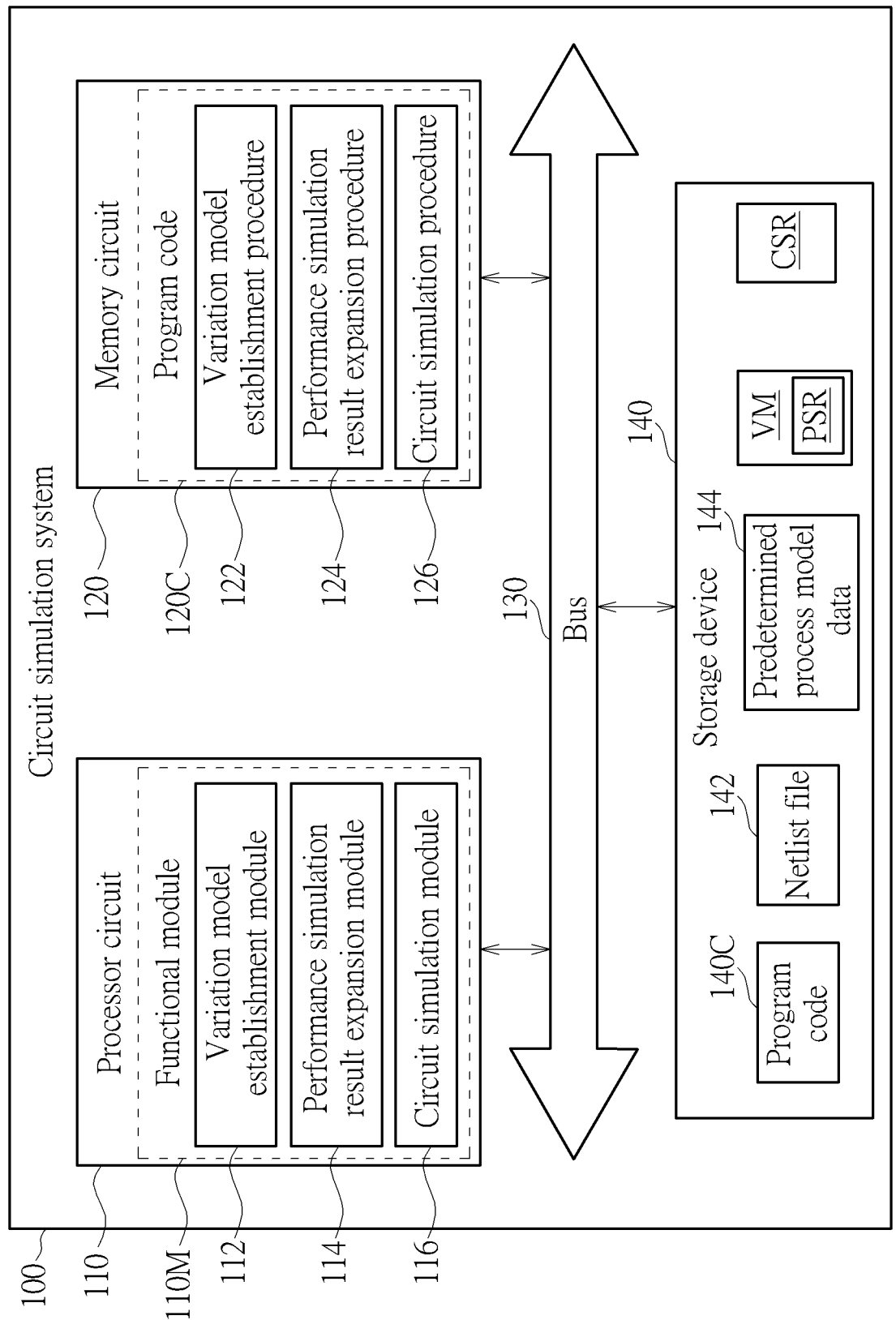
FIG. 1 is a diagram of a circuit simulation system according to an embodiment of the present invention.

FIG. 1 is a diagram of a circuit simulation system 100 according to an embodiment of the present invention. The circuit simulation system 100 may comprise at least one processor circuit (e.g., one or more processor circuits), which may be collectively referred to as the processor circuit 110, at least one memory circuit (e.g., one or more memory circuits), which may be collectively referred to as the memory circuit 120, a bus 130, and at least one storage device (e.g., one or more storage devices), which may be collectively referred to as the storage device 140, where multiple elements such as the processor circuit 110, the memory circuit 120, the storage device 140, etc. in the circuit simulation system 100 can be coupled to each other through the bus 130, but the present invention is not limited thereto. In some embodiments, the architecture shown in FIG. 1 may vary. In addition, the processor circuit 110 can be arranged to control the operations of the circuit simulation system 100, the memory circuit 120 can be arranged to temporarily store information for the circuit simulation system 100, the bus 130 can be arranged to perform internal signal transmission for the circuit simulation system 100, and the storage device 140 can be arranged to store information for the circuit simulation system 100.

For better comprehension, the circuit simulation system 100 may be implemented with a server, a personal computer such as a desktop computer and a laptop computer, etc. In particular, the processor circuit 110 may be implemented with a processor/processor core, etc., the memory circuit 120 may be implemented with a random access memory (RAM) such as a dynamic random access memory (DRAM), etc., and the storage device 140 can be implemented with a hard disk drive, a solid state drive (SSD), etc.

The memory circuit 120 can store a plurality of program codes 120C. The circuit simulation system 100 (e.g., the processor circuit 110) can load the program code 140C stored in the storage device 140 into the memory circuit 120 to be the program code 120C. The program code 140C may comprise an operating system, drivers, applications, etc., for being executed by processor circuit 110 to control the operations of circuit simulation system 100 when loaded into memory circuit 120. In particular, the processor circuit 110 may be arranged to execute the program code 120C to establish a variation model related to circuit characteristics for performing circuit simulation. For example, the program code 120C may comprise a variation model establishment procedure 122, a performance simulation result expansion procedure 124, and a circuit simulation procedure 126, and the processor circuit 110 may execute the variation model establishment procedure 122, the performance simulation result expansion procedure 124 and the circuit simulation procedure 126 to configure one or more sub-circuits (e.g., one or more processors/processor cores) of the processor circuit 110 into a variation model establishment module 112, a performance simulation result expansion module 114 and a circuit simulation module 116 among a plurality of functional modules 110M, respectively, for performing the variation model establishment, the performance simulation result expansion and the circuit simulation, respectively. The storage device 140 may store at least one netlist file (e.g., one or more netlist files), which may be collectively referred to as the netlist file 142, predetermined process model data 144 and at least one variation model (e.g., one or more variation models), which can be collectively referred to as the variation model VM. The circuit simulation system 100 (e.g., the processor circuit 110) can perform the variation model establishment, and more particularly, establish the variation model VM comprising a plurality of performance simulation results {PSR} according to the netlist file 142 and the predetermined process model data 144, for performing the circuit simulation to generate at least one circuit simulation result such as a circuit simulation result CSR.

Figure 2:
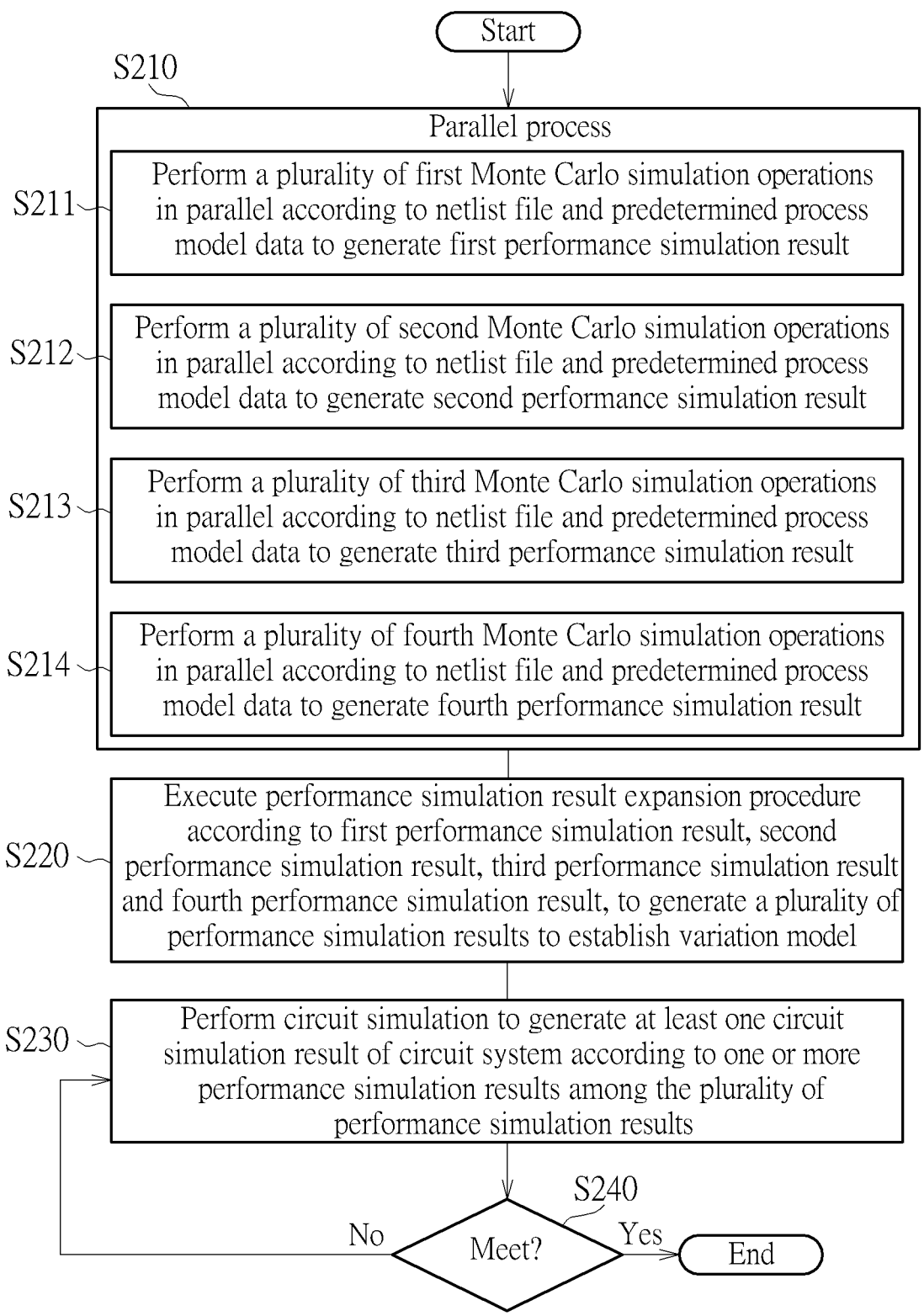
FIG. 2 is a flowchart of a method for establishing a variation model related to circuit characteristics for performing circuit simulation according to an embodiment of the present invention.

FIG. 2 is a flowchart of a method for establishing a variation model related to circuit characteristics for performing circuit simulation according to an embodiment of the present invention, where the method can be applied to the circuit simulation system 100 shown in FIG. 1.

In Step S210, the processor circuit 110 may perform parallel processing, and more particularly, perform the respective operations of the sub-steps S211-S214 of Step S210 in parallel.

In Step S211, the processor circuit 110 may perform a plurality of first Monte Carlo simulation operations in parallel according to the netlist file 142 and the predetermined process model data 144 to generate a first performance simulation result such as a performance simulation result PSR(1, 1), where the netlist file 142 can be arranged to indicate a basic circuit in a circuit system, but the present invention is not limited thereto. For example, the basic circuit may represent any basic circuit of a plurality of basic circuits (such as a plurality of standard cells) in the circuit system, and the netlist file 142 may be arranged to indicate the plurality of basic circuits.

In Step S212, the processor circuit 110 may perform a plurality of second Monte Carlo simulation operations in parallel according to the netlist file 142 and the predetermined process model data 144 to generate a second performance simulation result such as a performance simulation result PSR($M_1$, 1), where the symbol "$M_1$" can represent a positive integer greater than one.

In Step S213, the processor circuit 110 may perform a plurality of third Monte Carlo simulation operations in parallel according to the netlist file 142 and the predetermined process model data 144 to generate a third performance simulation result such as a performance simulation result PSR(1, $M_2$), where the symbol "$M_2$" can represent a positive integer greater than one.

In Step S214, the processor circuit 110 may perform a plurality of fourth Monte Carlo simulation operations in parallel according to the netlist file 142 and the predetermined process model data 144 to generate a fourth performance simulation result such as a performance simulation result PSR($M_1$, $M_2$).

In Step S220, the processor circuit 110 may execute the performance simulation result expansion procedure 124 according to the first performance simulation result, the second performance simulation result, the third performance simulation result and the fourth performance simulation result, to generate a plurality of performance simulation results {PSR} to establish the variation model VM, where the number of the plurality of performance simulation results {PSR} in the variation model VM is greater than four.

For better comprehension, in the situation where the first performance simulation result, the second performance simulation result, the third performance simulation result and the fourth performance simulation result represent the performance simulation results PSR(1, 1), PSR($M_1$, 1), PSR(1, $M_2$) and PSR($M_1$, $M_2$), respectively, the plurality of performance simulation results {PSR} may comprise ($M_1$*$M_2$) performance simulation results {{PSR(1, 1), ..., PSR($M_1$, 1)}, ..., {PSR (1, $M_2$), ..., PSR($M_1$, $M_2$)}}. For example, the performance simulation results PSR(1, 1), PSR($M_1$, 1), PSR(1, $M_2$), and PSR ($M_1$, $M_2$) may represent boundary values corresponding to boundary conditions, and the processor circuit 110 may perform interpolation operations according to the performance simulation results PSR (1, 1), PSR($M_1$, 1), PSR (1, $M_2$) and PSR ($M_1$, $M_2$) to generate corresponding interpolation results as the remaining performance simulation results (the performance simulation results except the performance simulation results PSR (1, 1), PSR($M_1$, 1), PSR(1, $M_2$) and PSR($M_1$, $M_2$)) among the ($M_1$*$M_2$) performance simulation results {{PSR (1, 1), ..., PSR ($M_1$, 1)}, ..., {PSR (1, $M_2$), ..., PSR ($M_1$, $M_2$)}}, but the present invention is not limited thereto. In some embodiments, the processor circuit 110 may perform interpolation and/or extrapolation operations according to the performance simulation results PSR (1, 1), PSR ($M_1$, 1), PSR (1, $M_2$) and PSR ($M_1$, $M_2$) to generate corresponding interpolation and/or extrapolation results as the remaining performance simulation results (the performance simulation results except the performance simulation results PSR (1, 1), PSR ($M_1$, 1), PSR (1, $M_2$) and PSR ($M_1$, $M_2$)) among the plurality of performance simulation results {PSR}.

In addition, the plurality of basic circuits and the plurality of standard cells may be referred to as basic circuits #1, #2 ... and #K and standard cells #1, #2 ... and #K, respectively, and the any basic circuit may be referred to as any basic circuit #k, where the basic circuit index k may be a positive integer in the interval [1, K], and the total number K of basic circuits #1, #2 ... and #K may be a positive integer greater than or equal to one thousand, but the present invention is not limited thereto. The plurality of performance simulation results {PSR} may represent a set of performance simulation results {$PSR_k$} corresponding to the any basic circuit #k among the K sets of performance simulation results { {$PSR_1$}, {$PSR_2$}, ..., {$PSR_K$}} respectively corresponding to the basic circuits #1, #2 ... and #K, and the number of performance simulation results in each set of performance simulation results (such as this set of performance simulation results {$PSR_k$}) among the K sets of performance simulation results {{$PSR_1$}, {$PSR_2$}, ..., {$PSR_K$}} in the variation model VM is greater than four. For example, basic circuits #1, #2 ... and #K (such as standard cells #1, #2 ... and #K) may comprise an inverter, an AND gate, an OR gate, etc.

Regarding the any basic circuit #k among the basic circuits #1, #2 ... and #K, the processor circuit 110 may perform the plurality of first Monte Carlo simulation operations, the plurality of second Monte Carlo simulation operation, the plurality of third Monte Carlo simulation operations, and the plurality of fourth Monte Carlo simulation operations in Steps S211-S214 to generate the first performance simulation result, the second performance simulation result, the third performance simulation result and the fourth performance simulation result corresponding to the any basic circuit #k, respectively, and more particularly, in Step S220, execute the performance simulation result expansion procedure 124 according to the first performance simulation result, the second performance simulation result, the third performance simulation result and the fourth performance simulation result corresponding to the any basic circuit #k to generate the set of performance simulation results { $PSR_k$} corresponding to the any base circuit #k to establish the variation model VM.

In Step S230, the processor circuit 110 may perform the circuit simulation to generate at least one circuit simulation result of the circuit system according to one or more performance simulation results among the plurality of performance simulation results. For example, regarding basic circuits #1, #2 ... and #K in the circuit system, the circuit simulation may comprise:

(1) selecting respective subsets of the K sets of performance simulation results {{$PSR_1$}, {$PSR_2$}, ..., {$PSR_K$}} from the K sets of performance simulation results {{$PSR_1$}, {$PSR_2$}, ..., {$PSR_K$}} according to a plurality of component parameters, and more particularly, selecting the performance simulation results that match the current values of the plurality of component parameters to be the above-mentioned respective subsets of the K sets of performance simulation results {{$PSR_1$}, {$PSR_2$}, ..., {$PSR_K$}}; and (2) generating the above-mentioned at least one circuit simulation result of the circuit system according to the above-mentioned respective subsets of the K sets of performance simulation results {{$PSR_1$}, {$PSR_2$}, ..., {$PSR_K$}};

wherein, each subset of the respective subsets of the K sets of performance simulation results {{$PSR_1$}, {$PSR_2$}, ..., {$PSR_K$}} may comprise one or more performance simulation results, but the invention is not limited thereto. For example, the loop comprising Steps S230 and S240 allows the processor circuit 110 to re-perform the circuit simulation, and the processor circuit 110 can select the performance simulation results that match the latest values of the plurality of component parameters to be the latest versions of the above-mentioned respective subsets of the K sets of performance simulation results {{PSR$_1$}, {PSR$_2$}, {PSR$_K$}}, for generating the latest version of the above-mentioned at least one circuit simulation result.

In Step S240, the processor circuit 110 may determine whether the above-mentioned at least one circuit simulation result (which is just generated in Step S230) meets a predetermined circuit design specification. If Yes (i.e., it meets the predetermined circuit design specification), end the working flow shown in FIG. 2; If No (i.e., it does not meet the predetermined circuit design specification), the Step S230 is entered to re-perform the circuit simulation. For example, the processor circuit 110 can selectively re-perform the circuit simulation according to the at least one circuit simulation result, where whether to re-perform the circuit simulation is determined according to whether the at least one circuit simulation result meets the predetermined circuit design specification.

Assuming that the determination result of Step S240 is No, and therefore Step S230 is entered to re-perform the circuit simulation. In this situation, regarding basic circuits #1, #2 . . . and #K in the circuit system, the circuit simulation may further comprise:
(1) updating (e.g., modifying) the plurality of component parameters; and
(2) selecting respective new subsets (which can be regarded as the latest versions of the above-mentioned subsets) of the K sets of performance simulation results {{PSR$_1$}, {PSR$_2$}, {PSR$_K$}} from the K sets of performance simulation results {{PSR$_1$}, {PSR$_2$}, . . . , {PSR$_K$}} according to the plurality of component parameters that have been updated, and more particularly, selecting the performance simulation results that match the latest values of the plurality of component parameters to be the above-mentioned respective new subsets of the K sets of performance simulation results {{PSR$_1$}, {PSR$_2$}, {PSR$_K$}}, for generating at least one new circuit simulation result (which can be regarded as the latest version of the above-mentioned at least one circuit simulation result) of the circuit system;
wherein, the processor circuit 110 can determine in Step S240 whether the above-mentioned at least one circuit simulation result (which is just generated in Step S230), such as the latest version thereof, meets the predetermined circuit design specification, for determining whether to re-perform the circuit simulation (once again).

For better comprehension, the method can be illustrated with the working flow shown in FIG. 2, but the present invention is not limited thereto. According to some embodiments, one or more steps may be added, deleted or changed in the working flow shown in FIG. 2.

According to some embodiments, the processor circuit 110 executing the performance simulation result expansion procedure 124 may perform the performance simulation result expansion based on machine learning according to the first performance simulation result, the second performance simulation result, the third performance simulation result and the fourth performance simulation result to generate the plurality of performance simulation results {PSR} to establish the variation model VM. For example, the processor circuit 110 may perform the interpolation operations based on machine learning according to the performance simulation results PSR (1, 1), PSR (M$_1$, 1), PSR (1, M$_2$) and PSR (M$_1$, M$_2$) to generate the corresponding interpolation results as the remaining performance simulation results among the (M$_1$*M$_2$) performance simulation results {{PSR (1, 1), . . . , PSR (M$_1$, 1)}, . . . , {PSR (1, M$_2$), . . . , PSR (M$_1$, M$_2$)}}, where the distribution of the (M$_1$*M$_2$) performance simulation results {{PSR (1, 1), . . . , PSR (M$_1$, 1)}, . . . , {PSR (1, M$_2$), . . . , PSR (M$_1$, M$_2$)}} can be linear or nonlinear. For another example, the processor circuit 110 may perform the interpolation and/or extrapolation operations based on machine learning according to the performance simulation results PSR(1, 1), PSR(M$_1$, 1), PSR(1, M$_2$) and PSR(M$_1$, M$_2$) to generate the corresponding interpolation and/or extrapolation results as the remaining performance simulation results among the plurality of performance simulation results {PSR}, where the distribution of the (M$_1$*M$_2$) performance simulation results {{PSR (1, 1), . . . , PSR (M$_1$, 1)}, . . . , {PSR (1, M$_2$), . . . , PSR (M$_1$, M$_2$)}} can be linear or nonlinear.

According to some embodiments, M$_1$=M$_2$=M, where the symbol "M" may represent a positive integer greater than one, but the invention is not limited thereto.

Figure 3:
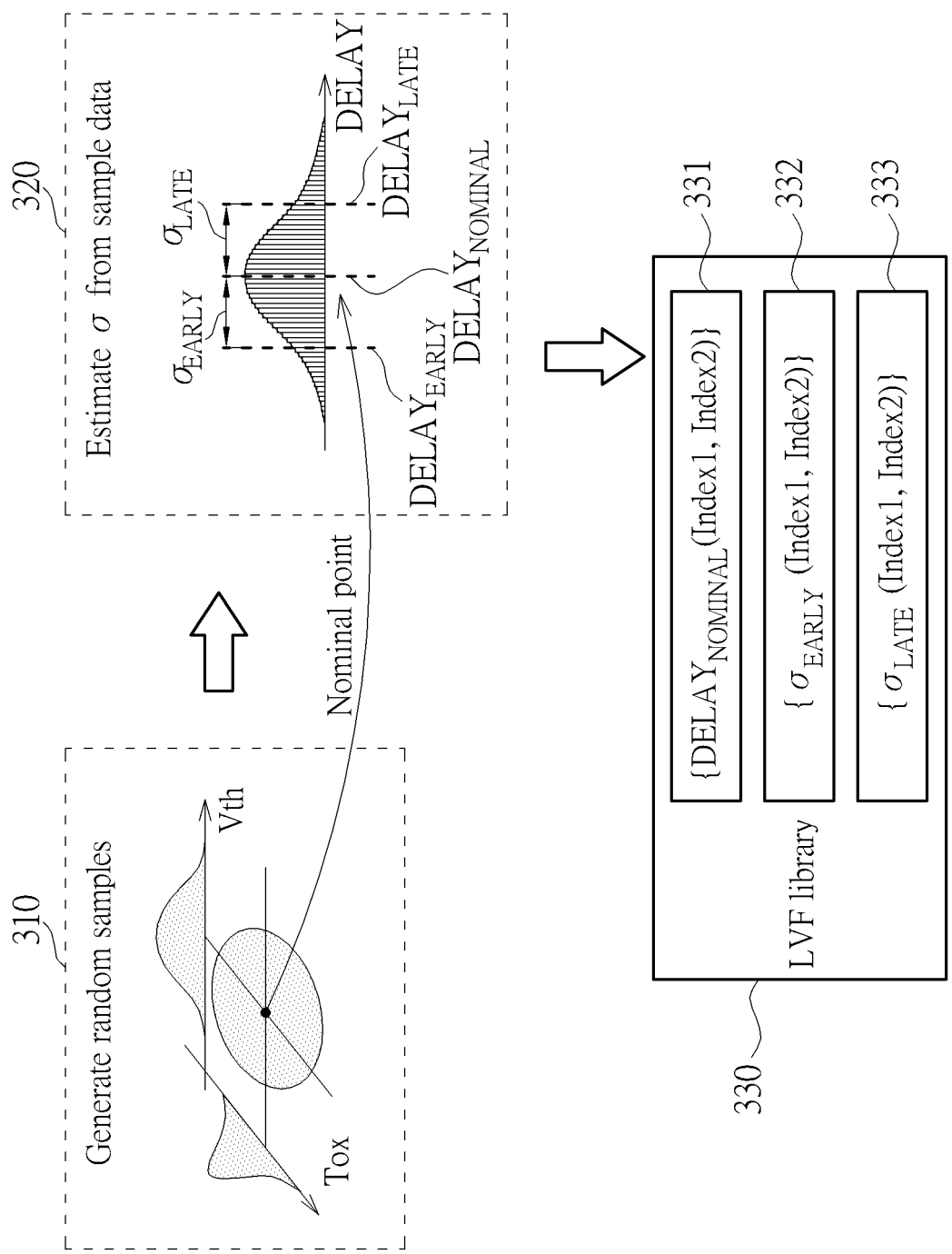
FIG. 3 illustrates a first variation model establishment control scheme of the method according to an embodiment of the present invention.

FIG. 3 illustrates a first variation model establishment control scheme of the method according to an embodiment of the present invention. During performing the variation model establishment, the processor circuit 110 executing the variation model establishment procedure 122 may perform a set of operations 310 for generating random samples and a set of operations 320 for estimating standard deviation (which may be represented by the notation "σ") from the sample data (labeled as "Generate random sample" and "Estimate σ from sample data" for brevity, respectively), and more particularly, perform the Monte Carlo simulation operations according to a set of corresponding parameter values for any random sample (e.g., each random sample) of these random samples to generate the performance simulation result corresponding to the any basic circuits #k, to establish the variation model VM, where the variation model VM may comprise at least one Liberty Variation Format library (LVF library) 330 such as a Monte Carlo (MC) LVF library, and the parameters Vth and Tox can be taken as examples of the plurality of component parameters, but the invention is not limited thereto. For example, a certain performance simulation result of these performance simulation results may comprise the simulation result of the distribution of the delay DELAY of the output signal to the input signal of the any basic circuit #k, such as the delay values DELAY$_{NOMINAL}$, DELAY$_{EARLY}$ and DELAY$_{LATE}$ and the standard deviation σ$_{EARLY}$ and σ$_{LATE}$, with respect to a nominal point.

For better comprehension, assume that a user of the circuit simulation system 100 has sufficient time (e.g., more than three months), and that it is permissible to spend a lot of time performing a large number of Monte Carlo simulation operations. The processor circuit 110 executing the variation model establishment procedure 122 can generate this set of performance simulation results {PSR$_k$} corresponding to the any basic circuit #k according to the first variation model establishment control scheme to establish the variation model VM, and more particularly, generate all performance simulation results {PSR$_k$} in this set of performance simulation results {PSR$_k$}, such as the simulation results of all possible combinations {{(Index1_1, Index2_1), . . . , (Index1_M$_1$, Index2_1)}, . . . , {(Index1_1, Index2_M$_2$), . . . , (Index1_M$_1$, Index2_M$_2$)}} of the respective predetermined candidate values Index1_1-Index1_M$_1$ and Index2_1-Index2_M$_2$ (that is, M$_1$ predetermined candidate values {Index1_1, Index1_2, . . . , Index1_M$_1$} and M$_2$ predetermined candidate values {Index2_1, Index2_2, . . . , Index2_$M_2$}) of the circuit characteristic indexes Index1 and Index2 of the any basic circuit #k, and the simulation results can comprise:

(1) a set of delay values 331 such as delay values {DELAY$_{NOMINAL}$ (Index1, Index2)}, comprising:
   {{DELAY$_{NOMINAL}$ (Index1_1, Index2_1), . . . , DELAY$_{NOMINAL}$ (Index1_$M_1$, Index2_1)}, . . . , {DELAY$_{NOMINAL}$ (Index1_1, Index2_$M_2$), . . . , DELAY$_{NOMINAL}$ (Index1_$M_1$, Index2_$M_2$)}};

(2) a first set of standard deviations 332 such as standard deviations {$\sigma_{EARLY}$ (Index1_1, Index2_1)}, comprising:
   {{$\sigma_{EARLY}$ (Index1_1, Index2_1), . . . , $\sigma_{EARLY}$ (Index1_$M_1$, Index2_1)}, {$\sigma_{EARLY}$ (Index1_1, Index2_$M_2$), . . . , $\sigma_{EARLY}$ (Index1_$M_1$, Index2_$M_2$)}}; and (3) a second set of standard deviations 333 such as standard deviations {$\sigma_{LATE}$ (Index1, Index2)}, comprising:
   {{$\sigma_{LATE}$ (Index1_1, Index2_1), . . . , $\sigma_{LATE}$ (Index1_$M_1$, Index2_1)}, {$\sigma_{LATE}$ (Index1_1, Index2_$M_2$), . . . , $\sigma_{LATE}$ (Index1_$M_1$, Index2_$M_2$)}};

wherein, the delay value DELAY$_{NOMINAL}$(Index1_i, Index2_j) and the standard deviations $\sigma_{EARLY}$ (Index1_i, Index2_j) and $\sigma_{LATE}$ (Index1_i, Index2_j) corresponding to the same combination (Index1_i, Index2_j) can be regarded as a performance simulation result PSR$_k$ in the set of performance simulation results {PSR$_k$}.

For example, this set of performance simulation results {PSR$_k$} corresponding to the any basic circuit #k may comprise ($M_1$*$M_2$) performance simulation results {{PSR$_k$ (1, 1), . . . , PSR$_k$ ($M_1$, 1)}, . . . , {PSR$_k$ (1, $M_2$) . . . , PSR$_k$ ($M_1$, $M_2$)}}, which can be collectively referred to as the performance simulation results {PSR$_k$ (i, j)|i=1, 2, . . . , $M_1$; j=1, 2, . . . , $M_2$}, and any performance simulation result PSR$_k$ (i, j) of these performance simulation results {PSR$_k$ (i, j)} may comprise a delay value DELAY$_{NOMINAL}$ (Index1_i, Index2_j) and standard deviations $\sigma_{EARLY}$ (Index1_i, Index2_j) and $\sigma_{LATE}$ (Index1_i, Index2_j). As a result, this set of performance simulation results {PSR$_k$} corresponding to the any basic circuit #k can be expressed as follows:

$$\{PSR_k(i,j)=(DELAY_{NOMINAL}(Index1\_i, Index2\_j), \sigma_{EARLY}(Index1\_i, Index2\_j), \sigma_{LATE}(Index1\_i, Index2\_j))|i=1,2,\ldots,M_1; j=1,2,\ldots,M_2\};$$

which can be equivalent to:

$$\{(DELAY_{NOMINAL}(Index1, Index2), \sigma_{EARLY}(Index1, Index2)\sigma_{LATE}(Index1, Index2))$$
$$|Index1=Index1\_1, Index1\_2, \ldots, Index1\_M_1;$$
$$Index2=Index2\_1, Index2\_2, \ldots, Index2\_M_2\};$$

but the present invention is not limited thereto.

Since it is very time-consuming to generate all performance simulation results {PSR$_k$} in this set of performance simulation results {PSR$_k$}, in the processor circuit 110, the variation model establishment module 112 (e.g., the processor circuit 110 executing the variation model establishment procedure 122) can generate only the performance simulation results PSR$_k$ (1, 1), PSR$_k$ ($M_1$, 1), PSR$_k$ (1, $M_2$) and PSR$_k$ ($M_1$, $M_2$) among this set of performance simulation results {PSR$_K$} in steps S211-S214, and call the performance simulation result expansion module 114 (e.g., the processor circuit 110 executing the performance simulation result expansion procedure 124) to perform the performance simulation result expansion (e.g., the performance simulation result expansion based on machine learning) according to the performance simulation results PSR$_k$ (1, 1), PSR$_k$ ($M_1$, 1), PSR$_k$ (1, $M_2$) and PSR$_k$ ($M_1$, $M_2$) in Step S220, to generate all performance simulation results {PSR$_k$} in this set of performance simulation results {PSR$_k$} to complete the establishment of the variation model VM, to allow the circuit simulation module 116 (e.g., the processor circuit 110 executing the circuit simulation procedure 126) to refer to the variation model VM in Step S230 to perform the circuit simulation. Therefore, the circuit simulation system 100 operating according to the method can simultaneously enhance circuit simulation speed and maintain circuit simulation accuracy without being hindered by the trade-off between circuit simulation speed and circuit simulation accuracy.

Figure 4:
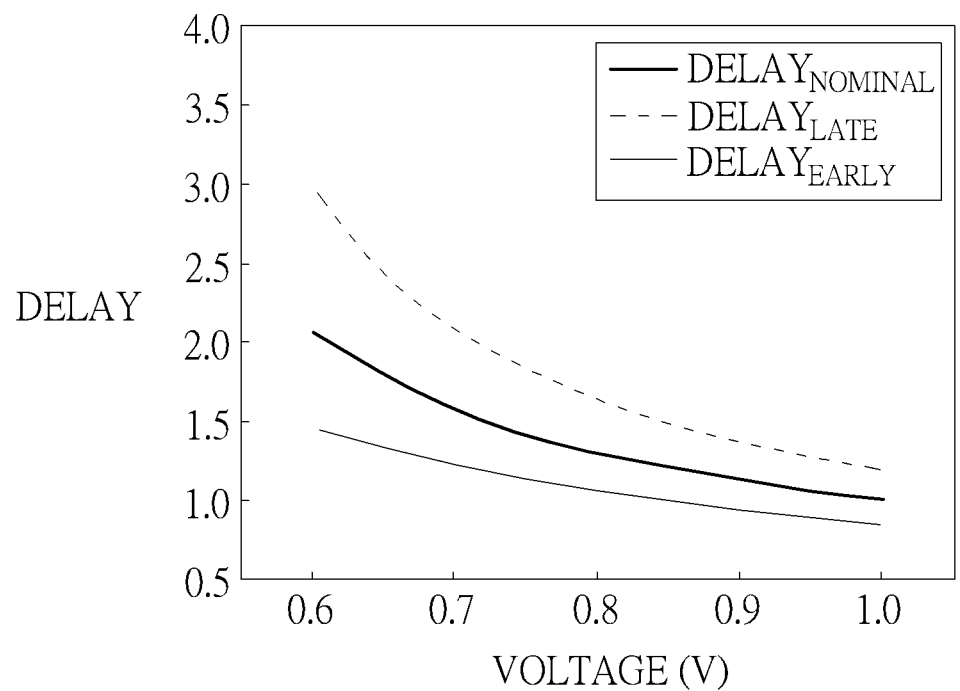
FIG. 4 illustrates some implementation details of the first variation model establishment control scheme as shown in FIG. 3 according to an embodiment of the present invention.

FIG. 4 illustrates some implementation details of the first variation model establishment control scheme as shown in FIG. 3 according to an embodiment of the present invention, where the horizontal axis may represent the voltage VOLTAGE, which can be measured in volts (V), and the vertical axis may represent the delay DELAY, which can be normalized in FIG. 4. The variation model VM may comprise this set of performance simulation results {PSR$_k$} corresponding to the any basic circuit #k, such as {PSR$_k$ (i, j)=(DELAY$_{NOMINAL}$ (Index1_i, Index2_j), $\sigma_{EARLY}$ (Index1_i, Index2_j), $\sigma_{LATE}$ (Index1_i, Index2_j))|i=1, 2, . . . , $M_1$; j=1, 2, . . . , $M_2$}, to indicate the distribution of the delay DELAY of the any basic circuit #k (e.g., the inverter) with respect to the voltage VOLTAGE applied to the any basic circuit #k, but the present invention is not limited thereto. For brevity, similar descriptions for this embodiment are not repeated in detail here.

Figure 5:
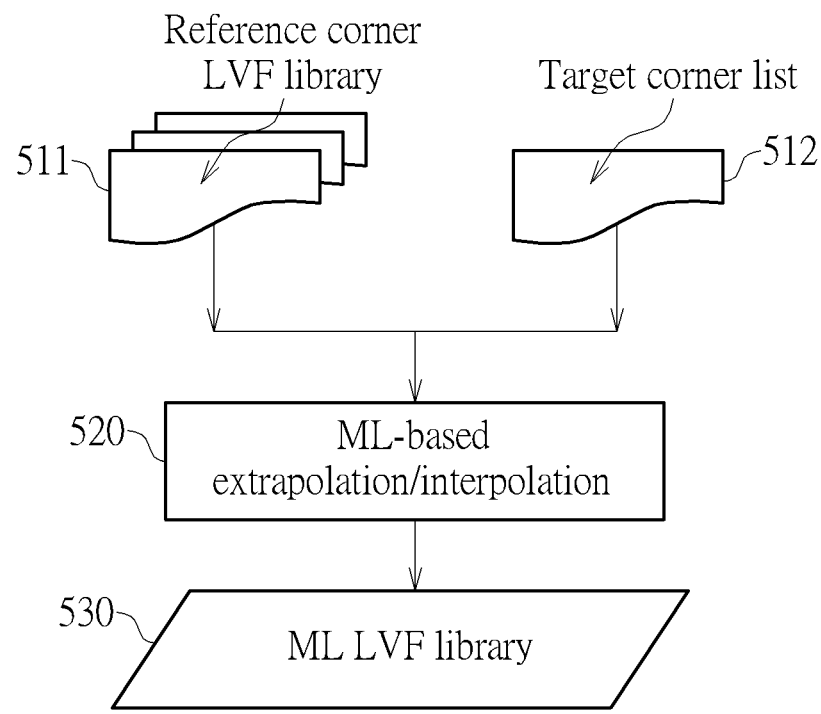
FIG. 5 illustrates another variation model establishment control scheme.

FIG. 5 illustrates another variation model establishment control scheme. Assume that the processor circuit 110 executing the variation model establishment procedure 122 can generate this set of performance simulation results {PSR$_k$} corresponding to the any basic circuit #k according to the other variation model establishment control scheme (i.e., the above-mentioned another variation model establishment control scheme) to establish the variation model VM, and more particularly, generate all performance simulation results {PSR$_k$} in this set of performance simulation results {PSR$_k$}. In this situation, the processor circuit 110 can perform the extrapolation/interpolation based on machine learning (ML) (hereinafter ML-based extrapolation/interpolation) 520 according to a reference corner LVF library 511 and a target corner list 512, and more particular, generate the ML LVF library 530. Typically, the term "corner" can represent a combination of process, voltage and temperature, such as a condition formed with a set of Process-Voltage-Temperature (P-V-T). The reference corner LVF library 511 may comprise the performance requirement information for a set of predetermined corners (e.g., a set of predetermined P-V-T conditions), and the target corner list 512 may comprise a set of target corners (e.g., a set of target P-V-T). Based on the other variation model establishment control scheme, since no Monte Carlo simulation operation is required, the speed of generating the ML LVF library 530 can be very fast. However, the accuracy of the ML LVF library 530 can be considerably low.

Figure 6:
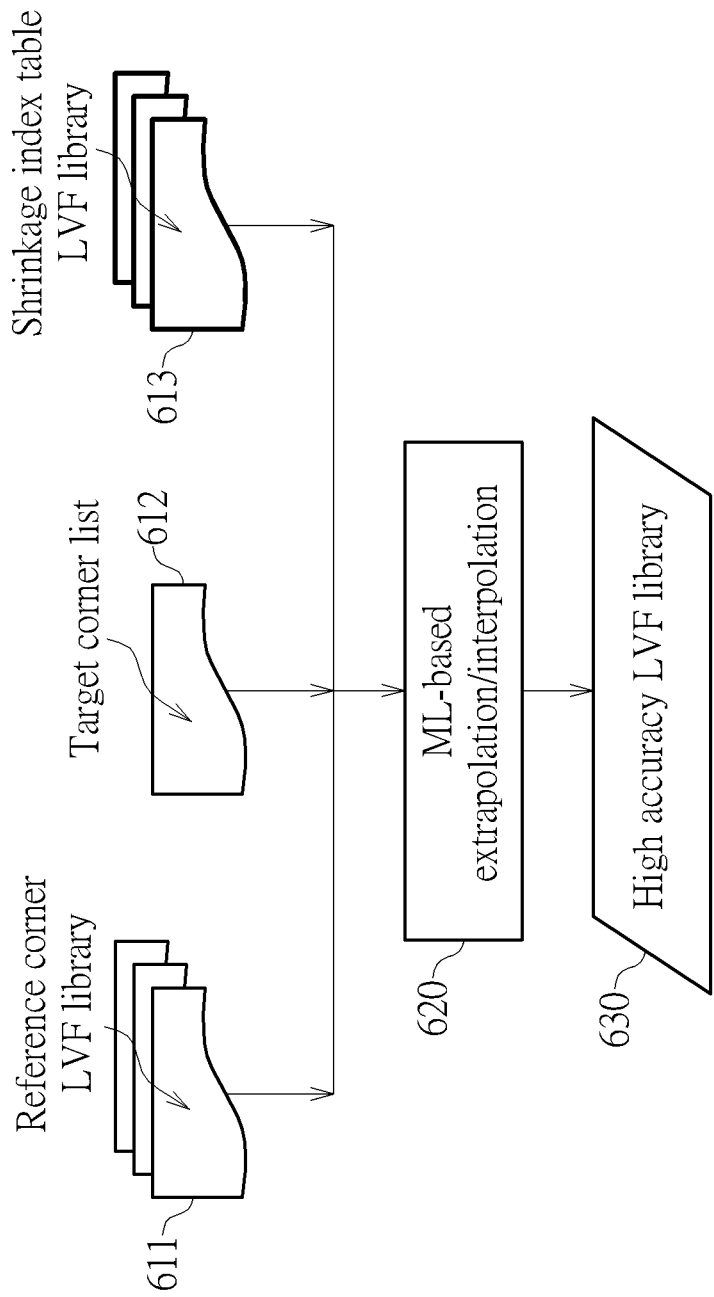
FIG. 6 illustrates a second variation model establishment control scheme of the method according to an embodiment of the present invention.

FIG. 6 illustrates a second variation model establishment control scheme of the method according to an embodiment of the present invention. For better comprehension, the reference corner LVF library 611 and the target corner list 612 may be equivalent to the reference corner LVF library 511 and the target corner list 512, respectively, and the ML-based extrapolation/interpolation 620 can be the same as or similar to the ML-based extrapolation/interpolation 520. The shrinkage index table LVF library 613 may represent at least one portion (e.g., a portion or all) of the LVF library 330, and more particularly, a compact version of the LVF library 330 rather than a complete version of the LVF library 330, where the complete version may comprise all performance simulation results $\{PSR_k\}$ in this set of performance simulation results $\{PSR_k\}$ corresponding to the any basic circuit #k, and the compact version may comprise the performance simulation results $PSR_k$ (1, 1), $PSR_k$ ($M_1$, 1), $PSR_k$ (1, $M_2$) and $PSR_k$($M_1$, $M_2$) in this set of performance simulation results $\{PSR_k\}$.

For example, the variation model establishment module 112 may generate only the performance simulation results $PSR_k$ (1, 1), $PSR_k$($M_1$, 1), $PSR_k$ (1, $M_2$) and $PSR_k$ ($M_1$, $M_2$) in this set of performance simulation results $\{PSR_k\}$ in Steps S211-S214 to establish the shrinkage index table LVF library 613, and call the performance simulation result expansion module 114 to perform the ML-based extrapolation/interpolation 620 according to the performance simulation results $PSR_k$ (1, 1), $PSR_k$ ($M_1$, 1), $PSR_k$ (1, $M_2$) and $PSR_k$ ($M_1$, $M_2$) in the shrinkage index table LVF library 613 in Step S220 to generate all performance simulation results $\{PSR_k\}$ in this set of performance simulation results $\{PSR_k\}$ to complete the establishment of the variation model VM, and more particularly, establish the variation model VM such as the high accuracy LVF library 630 to allow the circuit simulation module 116 to refer to the variation model VM such as the high accuracy LVF library 630 in Step S230 to perform the circuit simulation. For brevity, similar descriptions for this embodiment are not repeated in detail here.

Figure 7:
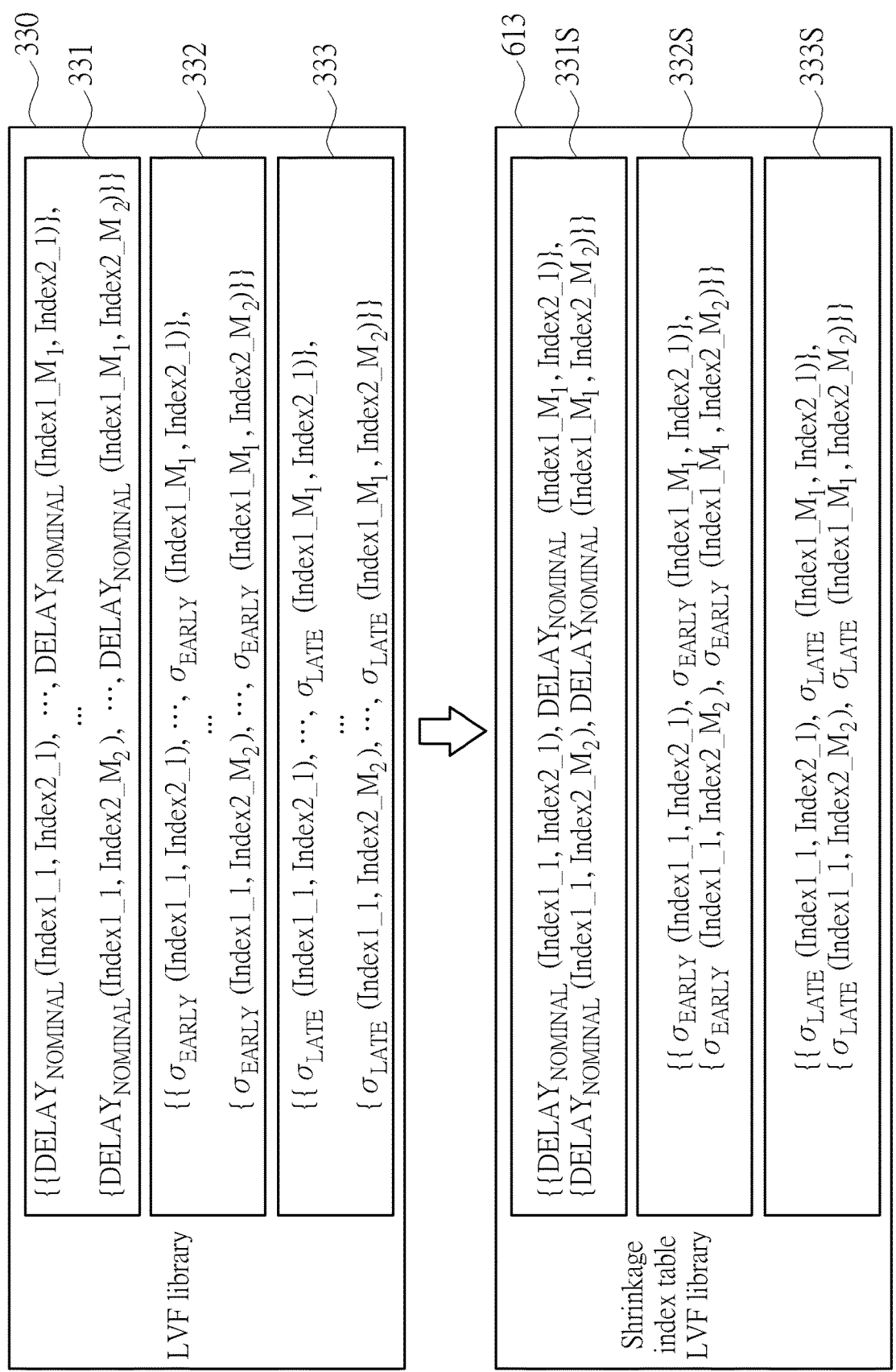
FIG. 7 illustrates some implementation details of the second variation model establishment control scheme as shown in FIG. 6 according to an embodiment of the present invention.

FIG. 7 illustrates some implementation details of the second variation model establishment control scheme as shown in FIG. 6 according to an embodiment of the present invention. The upper half of FIG. 7 indicates the complete version of the LVF library 330, where the complete version may comprise all performance simulation results $\{PSR_k\}$ in this set of performance simulation results $\{PSR_k\}$ corresponding to the any basic circuit #k, for example, the above-mentioned set of delay values 331 such as the delay values $\{DELAY_{NOMINAL}$ (Index1, Index2)$\}$, the first set of standard deviations 332 such as the standard deviations $\{\sigma_{EARLY}($Index1, Index2$)\}$, and the second set of standard deviations 333 such as the standard deviations $\{\sigma_{LATE}$ (Index1, Index2)$\}$. In addition, the lower half of FIG. 7 indicates that the shrinkage index table LVF library 613 can be implemented as the compact version of the LVF library 330, where the compact version can comprise the performance simulation result $PSR_k$ (1, 1), $PSR_k$ ($M_1$, 1), $PSR_k$ (1, $M_2$) and $PSR_k$ ($M_1$, $M_2$) in this set of performance simulation results $\{PSR_k\}$, for example, the respective subsets of the above-mentioned set of delay values 331, the first set of standard deviations 332 and the second set of standard deviations 333 in the complete version, such as the delay values 331S, the standard deviations 332S and 333S. For brevity, similar descriptions for this embodiment are not repeated in detail here.

Figure 8:
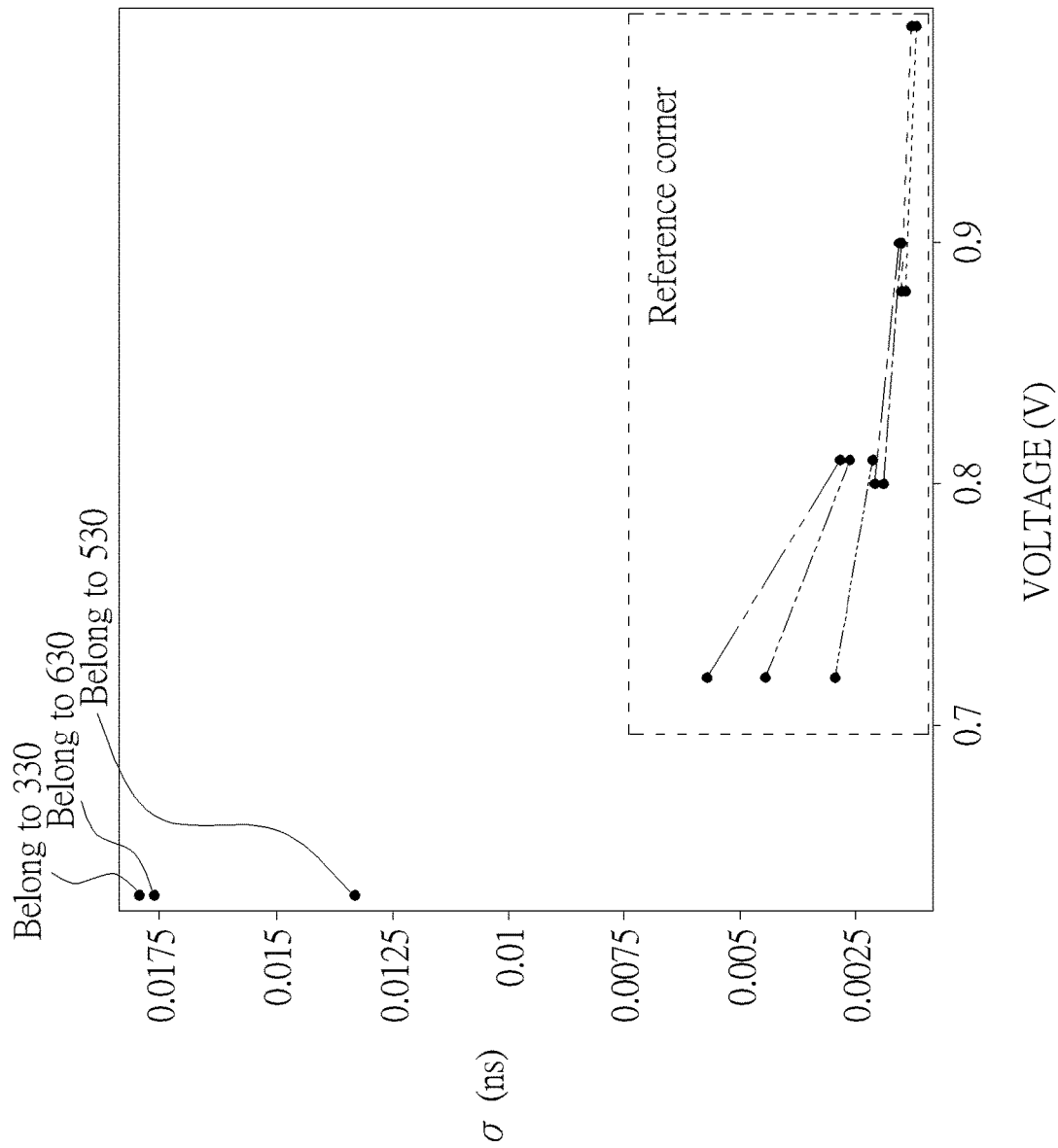
FIG. 8 illustrates the accuracy of the second variation model establishment control scheme as shown in FIG. 6 according to an embodiment of the present invention.

FIG. 8 illustrates the accuracy of the second variation model establishment control scheme as shown in FIG. 6 according to an embodiment of the present invention, where the horizontal axis may represent the voltage VOLTAGE, which can be measured in volts (V), and the vertical axis may represent the delay DELAY, which can be measured in nanoseconds (ns). As shown in the lower right part of FIG. 8, a plurality of sets of curves respectively corresponding to a plurality of voltage ranges can indicate the performance requirements of the reference corners. The complete version of the LVF library 330 can be generated based on the first variation model establishment control scheme, and can be very accurate. For example, a data point belonging to the complete version of the LVF library 330 (labeled "Belong to 330" for brevity) can be very accurate and can be suitable for being a reference for the circuit simulation, making the simulation results of the circuit simulation be very close to the test results of the circuit system in mass production. In addition, the ML LVF library 530 can be generated based on the other variation model establishment control scheme, and the accuracy thereof can be considerably low. For example, a data point belonging to the ML LVF library 530 (labeled "Belong to 530" for brevity) may be inaccurate and not suitable for being used as a reference for the circuit simulation since the ML LVF library 530 may cause the tests of the circuit system in mass production to be unsuccessful. Additionally, the high accuracy LVF library 630 can be generated based on the second variation model establishment control scheme, and is more accurate. For example, a data point belonging to the high accuracy LVF library 630 (labeled "Belong to 630" for brevity) can also be very accurate and also suitable for being used as a reference for the circuit simulation, making the simulation results of the circuit simulation be very close to the test results of the circuit system in mass production. For brevity, similar descriptions for this embodiment are not repeated in detail here.

Figure 9:
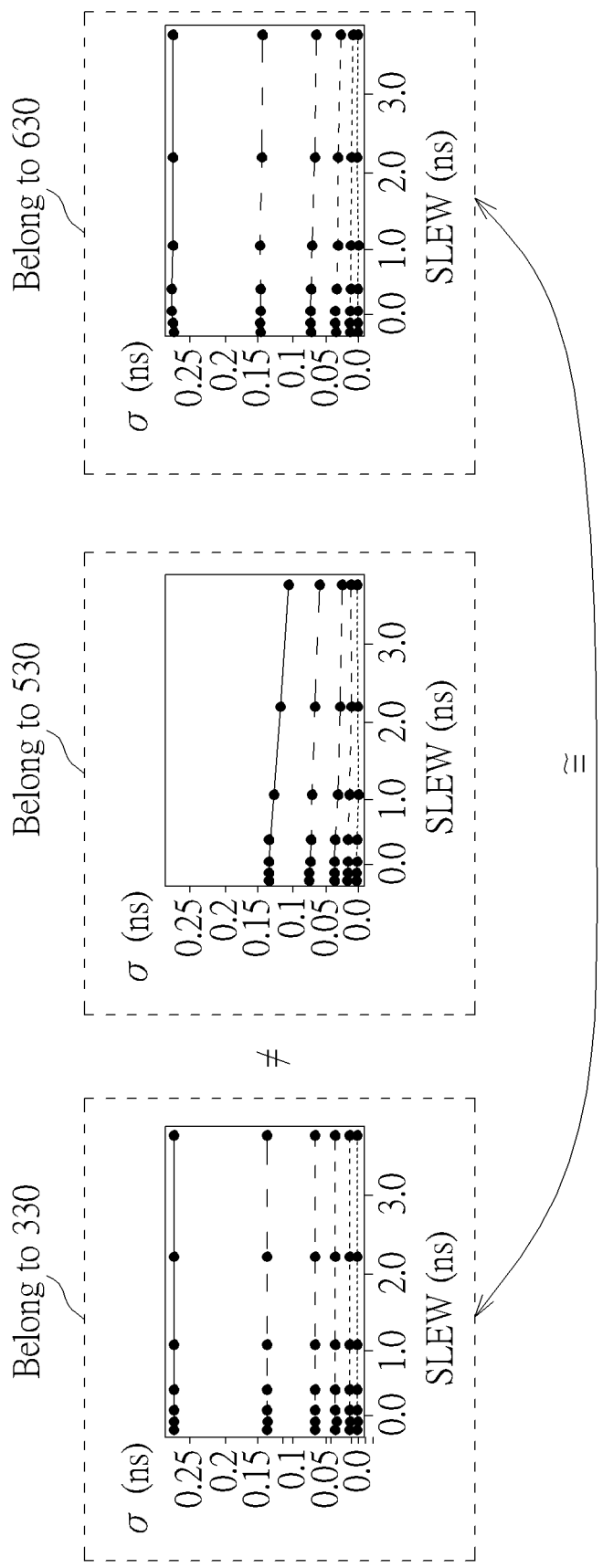
FIG. 9 illustrates the accuracy of the second variation model establishment control scheme as shown in FIG. 6 according to another embodiment of the present invention.

FIG. 9 illustrates the accuracy of the second variation model establishment control scheme as shown in FIG. 6 according to another embodiment of the present invention, where the horizontal and vertical axes represent the slew rate SLEW and the standard deviation $\sigma$, respectively, which can be measured in nanoseconds (ns). Since the slew rate SLEW of a certain signal can be expressed with the change of voltage per unit of time to indicate the slope of a partial waveform of this signal, for a predetermined voltage variation amount, the slew rate SLEW can also be expressed with time to indicate the same slope. The predetermined voltage variation amount may represent a main range in the voltage range (e.g., the interval $[V_{MIN}, V_{MAX}]$) defined by the minimum value $V_{MIN}$ and the maximum value $V_{MAX}$ of the voltage of this signal, such as the interval $[V_{MIN}+((V_{MAX}-V_{MIN})*P_{SLOW}), V_{MAX}-((V_{MAX}-V_{MIN})*P_{SLEW})]$. For better comprehension, the range parameter $P_{SLEW}$ may be equal to 30%, but the present invention is not limited thereto. The range parameter $P_{SLEW}$ can be equal to any value in the interval (0, 1), such as 5%, 10%, 15%, 20%, etc., as long as the implementation of the present invention is not hindered.

For example, a set of curves belonging to the complete version of the LVF library 330 (labeled "Belong to 330" for brevity) can be very accurate and suitable for being used as a reference for the circuit simulation, making the simulation results of the circuit simulation be very close to the test results of the circuit system in mass production. In addition, a set of curves belonging to the ML LVF library 530 (labeled "Belong to 530" for brevity) may be inaccurate and not suitable for being used as a reference for the circuit simulation since the ML LVF library 530 may cause the tests of the circuit system in mass production to be unsuccessful. Furthermore, a set of curves belonging to the high accuracy LVF library 630 (labeled as "Belong to 630" for brevity) is also more accurate, and is also suitable for being used as a reference for the circuit simulation, making the simulation results of the circuit simulation be very close to the test results of the circuit system in mass production. FIG. 9 clearly indicates that the set of curves belonging to the ML LVF library 530 is not equal to (or cannot be considered equal to) the set of curves belonging to the complete version of the LVF library 330 (labeled with "0" for brevity), and the set of curves belonging to the high accuracy LVF library 630 is approximately equal to (or can be considered equal to) the set of curves belonging to the complete version of the LVF library 330 (labeled with "≅" for brevity). For brevity, similar descriptions for this embodiment are not repeated in detail here.

Figure 10:
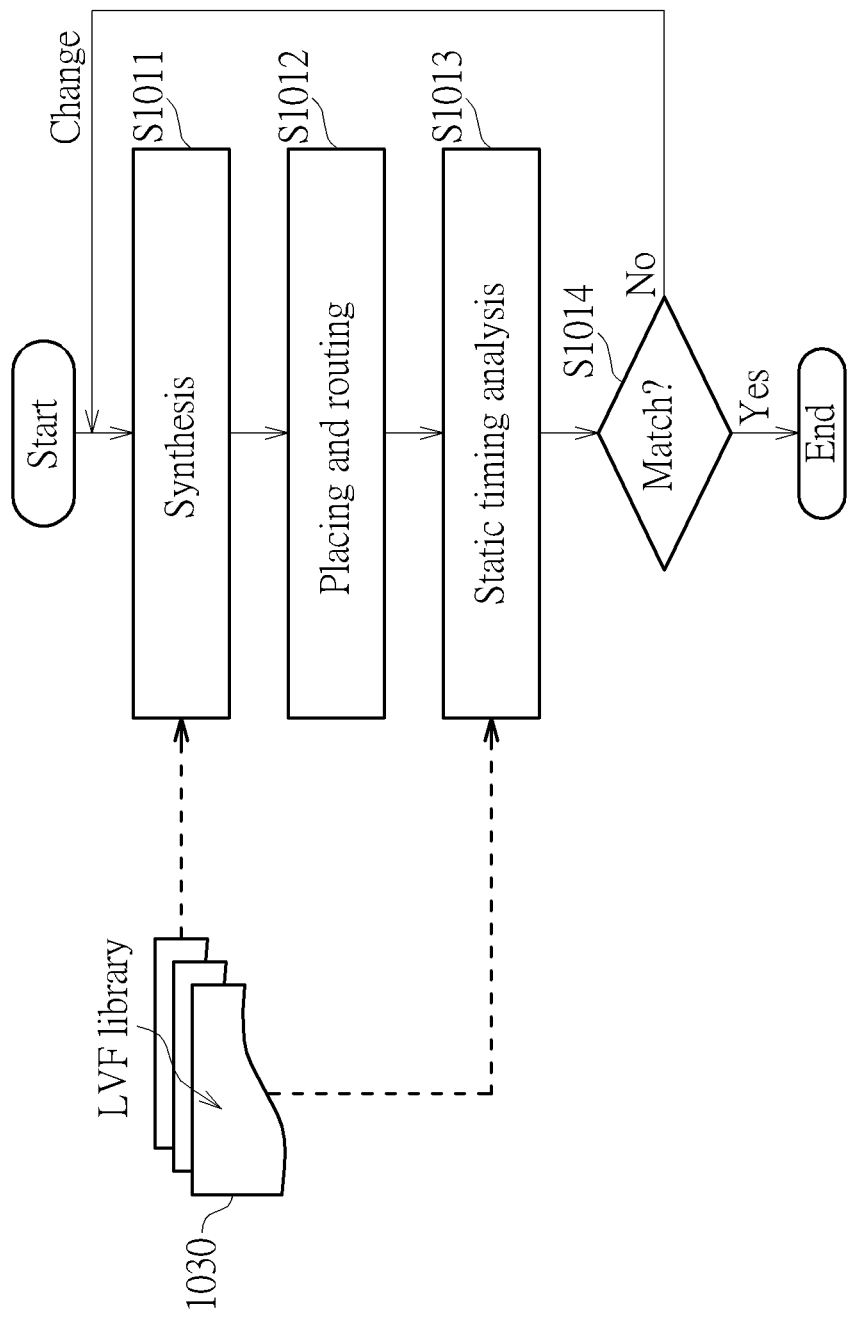
FIG. 10 illustrates a working flow of the method according to an embodiment of the present invention.

FIG. 10 illustrates a working flow of the method according to an embodiment of the present invention. The circuit simulation module 116 (e.g., the processor circuit 110 executing the circuit simulation procedure 126) can perform the operations of Steps S1011-S1014, and more particularly, can refer to a design margin provided by an LVF library 1030 to perform the operations of Steps S1011 and S1013, where the circuit simulation mentioned in Step S230 may comprise the operations of Steps S1011-S1013. For example, the LVF library 1030 may comprise the at least one LVF library such as the high accuracy LVF library 630.

In Step S1011, the circuit simulation module 116 may perform synthesis operations according to the LVF library 1030 to convert the information used for describing the operations of the circuit system into at least one portion of basic circuits among the basic circuits #1, #2, . . . and #K (such as the standard cells #1, #2 . . . and #K), for example, the basic circuits #1, #2, . . . and #K0, where the symbol "K0" can represent a positive integer less than or equal to K.

In Step S1012, the circuit simulation module 116 may perform placing and routing operations to establish a circuit system model of the circuit system.

In Step S1013, the circuit simulation module 116 may perform static timing analysis (STA) to generate at least one STA result as the above-mentioned at least one circuit simulation result in Step S230.

In Step S1014, the circuit simulation module 116 may determine whether the above-mentioned at least one circuit simulation result such as the above-mentioned at least one STA result (which is just generated in Step S1013) matches the predetermined circuit design specification. If Yes, end the working flow shown in FIG. 10; if No, Step S1011 is entered to re-perform the circuit simulation.

Assume that the determination result of Step S1014 is No, and therefore Step S1011 is entered to re-perform the circuit simulation. In this situation, regarding the above-mentioned at least one portion of the basic circuits among the basic circuits #1, #2 . . . and #K in the circuit system, such as the basic circuits #1, #2, . . . and #K0, the circuit simulation module 116 may update (e.g., change) the plurality of component parameters (labeled as "Change" for brevity), and in Step S1013, select the respective new subsets of the K0 sets of performance simulation results $\{\{PSR_1\}, \{PSR_2\}, \ldots, \{PSR_{K0}\}\}$ from the K0 sets of performance simulation results $\{\{PSR_1\}, \{PSR_2\}, \ldots, \{PSR_{K0}\}\}$ according to the plurality of component parameters that have been updated, and more particularly, select the performance simulation results that match the latest values of the plurality of component parameters to be the above-mentioned respective new subsets of the K0 sets of performance simulation results $\{\{PSR_1\}, \{PSR_2\}, \ldots, \{PSR_{K0}\}\}$ for generating the latest version of the above-mentioned at least one circuit simulation result (e.g., the above-mentioned at least one STA result) of the circuit system, where the circuit simulation module 116 may determine in Step S1014 whether the above-mentioned at least one circuit simulation result (just generated in Step S1013), such as the latest version thereof, meets the predetermined circuit design specification, for determining whether to re-perform the circuit simulation (once again). For brevity, similar descriptions for this embodiment are not repeated in detail here.

For better comprehension, the method can be illustrated with the working flow shown in FIG. 10, but the present invention is not limited thereto. According to some embodiments, one or more steps may be added, deleted or changed in the working flow shown in FIG. 10.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for establishing a variation model related to circuit characteristics for performing circuit simulation, the method comprising:
    performing a plurality of first Monte Carlo simulation operations in parallel according to a first netlist file and predetermined process model data to generate a first performance simulation result, wherein the first netlist file is arranged to indicate a basic circuit in a circuit system;
    performing a plurality of second Monte Carlo simulation operations in parallel according to the first netlist file and the predetermined process model data to generate a second performance simulation result;
    performing a plurality of third Monte Carlo simulation operations in parallel according to the first netlist file and the predetermined process model data to generate a third performance simulation result;
    performing a plurality of fourth Monte Carlo simulation operations in parallel according to the first netlist file and the predetermined process model data to generate a fourth performance simulation result; and
    executing a performance simulation results expansion procedure according to the first performance simulation result, the second performance simulation result, the third performance simulation result and the fourth performance simulation result to generate a plurality of performance simulation results to establish the variation model, for performing the circuit simulation to generate at least one circuit simulation result of the circuit system according to one or more performance simulation results among the plurality of performance simulation results, wherein the number of the plurality of performance simulation results in the variation model is greater than four.

2. The method of claim 1, wherein the basic circuit represents any basic circuit of a plurality of basic circuits in the circuit system, and the plurality of performance simulation results represent a set of performance simulation results corresponding to the any basic circuit among a plurality of sets of performance simulation results respectively corresponding to the plurality of basic circuits.

3. The method of claim 2, wherein the number of performance simulation results in each set of performance simulation results among the plurality of sets of performance simulation results in the variation model is greater than four.

4. The method of claim 2, wherein regarding the any basic circuit of the plurality of basic circuits, the plurality of first Monte Carlo simulation operations, the plurality of second Monte Carlo simulation operations, the plurality of third Monte Carlo simulation operations and the plurality of fourth Monte Carlo simulation operations are performed to respectively generate the first performance simulation result, the second performance simulation result, the third performance simulation result and the fourth performance simulation result corresponding to the any basic circuit.

5. The method of claim 4, wherein regarding the any basic circuit of the plurality of basic circuits, the performance simulation results expansion procedure is executed according to the first performance simulation result, the second performance simulation result, the third performance simulation result and the fourth performance simulation result corresponding to the any basic circuit, to generate the set of performance simulation results corresponding to the any basic circuit to establish the variation model.

6. The method of claim 2, wherein regarding the plurality of basic circuits in the circuit system, the circuit simulation comprises:

generating the at least one circuit simulation result of the circuit system according to respective subsets of the plurality of sets of performance simulation results, wherein each subset of the respective subsets of the plurality of sets of performance simulation results comprises one or more performance simulation results.

7. The method of claim 6, wherein regarding the plurality of basic circuits in the circuit system, the circuit simulation further comprises:

selecting the respective subsets of the plurality of sets of performance simulation results from the plurality of sets of performance simulation results according to a plurality of component parameters, for generating the at least one circuit simulation result of the circuit system.

8. The method of claim 7, wherein regarding the plurality of basic circuits in the circuit system, the circuit simulation further comprises:

updating the plurality of component parameters, and selecting respective new subsets of the plurality of sets of performance simulation results from the plurality of sets of performance simulation results according to the plurality of component parameters that have been updated, for generating at least one new circuit simulation result of the circuit system.

9. The method of claim 1, wherein a first circuit characteristic index and a second circuit characteristic index of the basic circuit are configurable as one of a plurality of first predetermined candidate values of the first circuit characteristic index and one of a plurality of second predetermined candidate values of the second circuit characteristic index, respectively; and the plurality of first Monte Carlo simulation operations, the plurality of second Monte Carlo simulation operations, the plurality of third Monte Carlo simulation operations and the plurality of fourth Monte Carlo simulation operations are performed under situations where the first circuit characteristic index and the second circuit characteristic index being set as a first combination, a second combination, a third combination and a fourth combination of the plurality of first predetermined candidate values and the plurality of second predetermined candidate values, respectively.

10. A circuit simulation system, comprising:

at least one memory circuit, configured to store a plurality of program codes; and at least one processor circuit, configured to execute the plurality of program codes in the at least one memory circuit to establish a variation model related to circuit characteristics for performing circuit simulation;

wherein:

the at least one processor circuit performs a plurality of first Monte Carlo simulation operations in parallel according to a first netlist file and predetermined process model data to generate a first performance simulation result, wherein the first netlist file is arranged to indicate a basic circuit in a circuit system;

the at least one processor circuit performs a plurality of second Monte Carlo simulation operations in parallel according to the first netlist file and the predetermined process model data to generate a second performance simulation result;

the at least one processor circuit performs a plurality of third Monte Carlo simulation operations in parallel according to the first netlist file and the predetermined process model data to generate a third performance simulation result;

the at least one processor circuit performs a plurality of fourth Monte Carlo simulation operations in parallel according to the first netlist file and the predetermined process model data to generate a fourth performance simulation result; and the at least one processor circuit executes a performance simulation results expansion procedure according to the first performance simulation result, the second performance simulation result, the third performance simulation result and the fourth performance simulation result to generate a plurality of performance simulation results to establish the variation model, for performing the circuit simulation to generate at least one circuit simulation result of the circuit system according to one or more performance simulation results among the plurality of performance simulation results, wherein the number of the plurality of performance simulation results in the variation model is greater than four.

* * * * *